(12) United States Patent
File et al.

(10) Patent No.: US 10,495,307 B2
(45) Date of Patent: Dec. 3, 2019

(54) OPTIMIZATION OF GAS FIRED RADIANT TUBE HEATERS

(71) Applicant: Superior Radiant Products Ltd., Stoney Creek (CA)

(72) Inventors: Gjergji File, Oakville (CA); Kevin Merritt, Burlington (CA)

(73) Assignee: Superior Radiant Products Ltd., Stoney Creek (CA)

( * ) Notice: Subject to any disclaimer, the term of this patent is extended or adjusted under 35 U.S.C. 154(b) by 149 days.

(21) Appl. No.: 15/489,781

(22) Filed: Apr. 18, 2017

(65) Prior Publication Data

US 2017/0314784 A1 Nov. 2, 2017

Related U.S. Application Data

(60) Provisional application No. 62/328,045, filed on Apr. 27, 2016.

(51) Int. Cl.
| | |
|---|---|
| *F23D 14/62* | (2006.01) |
| *F23N 3/00* | (2006.01) |
| *F24D 10/00* | (2006.01) |
| *F28C 3/02* | (2006.01) |
| *F23C 3/00* | (2006.01) |
| *F23D 14/12* | (2006.01) |
| *F23L 15/04* | (2006.01) |

(Continued)

(52) U.S. Cl.
CPC ............. *F23N 3/007* (2013.01); *F23C 3/002* (2013.01); *F23D 14/12* (2013.01); *F23D 14/62* (2013.01); *F24D 10/003* (2013.01); *F28C 3/02* (2013.01); *F23D 14/66* (2013.01); *F23D 14/70* (2013.01); *F23D 2900/14* (2013.01); *F23L 15/04* (2013.01); *F23N 2033/10* (2013.01); *Y02B 30/17* (2018.05); *Y02E 20/348* (2013.01)

(58) Field of Classification Search
CPC .................................. F23N 3/007; F23N 3/002
USPC .................................................. 431/9, 181, 11
See application file for complete search history.

(56) References Cited

U.S. PATENT DOCUMENTS

| 2,188,133 A * | 1/1940 | Hepburn ................. F23C 3/002 |
| | | 126/91 A |
| 4,800,866 A * | 1/1989 | Finke ...................... F23C 3/002 |
| | | 126/91 A |

(Continued)

*Primary Examiner* — Avinash A Savani
(74) *Attorney, Agent, or Firm* — Ridout & Maybee LLP

(57) ABSTRACT

The present invention is a method of optimizing radiant and thermal efficiency of a gas fired radiant tube heater. A heat exchange blower receives intake air and delivers intake air through a heat exchanger as pre-heated air to a combustion air blower. The combustion air blower receives pre-heated intake air from the heat exchanger and then provides the pre-heated intake air to a burner for mixing with fuel. The fuel-intake air mixture is burned in the burner thereby producing combustion gasses which are fired into a radiant tube. The exhaust combustion gases pass through the balance of the radiant tube and through the heat exchanger where residual heat is transferred and extracted from the combustion gases to pre-heat the intake air. The turbulators are configured to increase the turbulence within the radiant tube and are placed within the initial 10' to 30' of the radiant tube after the burner to increase the tube temperature and the radiation emitted from this section of the radiant tube.

15 Claims, 8 Drawing Sheets

(51) Int. Cl.
*F23D 14/66* (2006.01)
*F23D 14/70* (2006.01)

(56) References Cited

U.S. PATENT DOCUMENTS

| | | | | |
|---|---|---|---|---|
| 4,870,947 | A * | 10/1989 | Kawamoto | F23C 3/002 126/91 A |
| 6,027,333 | A * | 2/2000 | Fujii | F23C 3/002 126/91 A |
| 6,190,159 | B1 * | 2/2001 | Moore | F23C 3/002 126/91 A |
| 6,375,740 | B1 * | 4/2002 | Ogino | C23C 2/02 118/66 |
| 7,066,170 | B1 * | 6/2006 | Atemboski | F24B 1/1808 126/502 |
| 2007/0054227 | A1 * | 3/2007 | Tada | F23C 3/002 431/181 |
| 2011/0165528 | A1 * | 7/2011 | Pitocco | F23C 3/002 431/215 |
| 2013/0092150 | A1 * | 4/2013 | Halverson | F24C 3/002 126/523 |

* cited by examiner

OPTIMIZATION OF GAS FIRED RADIANT TUBE HEATERS

This application claims priority from previously filed U.S. provisional patent application 62/328,045. filed Apr. 27, 2016 by Gjergji File and Kevin Merritt under the title OPTIMIZATION OF GAS FIRED RADIANT TUBE HEATERS.

FIELD OF THE INVENTION

The present concept relates to gas fired radiant tube heaters and more particularly relates to a method of optimizing the radiant and thermal efficiency of gas fired radiant tube heaters.

BACKGROUND OF THE INVENTION

Gas fired radiant tube heaters have become a commercially popular method for providing heat in larger commercial buildings where conventional convective and forced air gas heating systems cannot be implemented efficiently.

For example larger buildings may have doors, such as service bays, which are constantly being opened and closed resulting in large amounts of air being exchanged constantly throughout the day. Heating these types of buildings using conventional forced air gas or convective type heating systems results in large inefficiencies.

Under these circumstances radiant heating is the preferred method of providing heat to the building and often the choice is to use gas-fired radiant tube heaters to provide the necessary radiant heating.

Gas-fired radiant tube heaters have been in commercial use for quite some time now however very little attention has been directed to the radiant efficiency of the heat emission from the heater as well as the total thermal efficiency of the heater. Maximizing the radiant and thermal efficiency of the heater will minimize the operating cost of the system and therefore it is desirable to optimize both the radiant efficiency as well as the thermal efficiency of gas-fired radiant tube heaters.

It is an object of the present concept to improve the radiant efficiency as well as the thermal efficiency of gas fired radiant tube heaters.

SUMMARY OF THE INVENTION

The present invention is a method of optimizing radiant and thermal efficiency of a gas fired radiant tube heater. This method includes providing a heat exchange blower to receive intake air and to deliver intake air through a heat exchanger and to further deliver pre-heated intake air to a combustion air blower.

The combustion air blower receives pre-heated intake air from the heat exchanger, and then provides pre-heated intake air to a burner for mixing with fuel. The burner burns the fuel-intake air mixture thereby producing combustion gasses which are fired into a radiant tube.

Exhaust combustion gases are passed through the balance of the radiant tube and through the heat exchanger to transfer and extract residual heat from the combustion gases to pre-heat the intake air.

The method of optimizing radiant and thermal efficiency of a gas fired radiant tube heater preferably includes placing turbulators within the radiant tube. The turbulators are configured to increase the turbulence within the radiant tube and are placed in a region of the radiant tube such that they increase the radiant energy dissipated by the tube by at least 75% measured in $kw/m^2$.

Preferably the turbulators are placed in a region of the radiant tube where the tube temperature is higher than 600° F. such that they increase the tube temperature by at least 100° F.

Preferably the heat exchanger is a gas to gas heat exchanger.

Preferably the turbulators increase the turbulence within the radiant tube and are placed in a region of the radiant tube where the tube temperature is higher than 400° F.

Preferably the turbulators are placed within the initial 10' to 30' of the radiant tube after the burner thereby increasing the tube temperature and the radiation emitted from this section of the radiant tube.

Preferably the turbulators are placed within the initial 10' to 20' of the radiant tube thereby increasing the tube temperature and the radiation emitted from this section of the radiant tube.

Preferably dilution air is introduced into the combustion gases at the heat exchanger in order to reduce the exhaust gas temperature to below 230° F. The dilution air is provided by the heat exchanger blower. The dilution air is modulated to control the exhaust gas temperature to below 230° F.

Preferably the exhaust manifold is manufactured from plastic.

The present method of optimizing radiant thermal efficiency of gas fired radiant tube heaters could further include a condensing section which receives exhaust gas from the heat exchanger for further extracting sensible heat and latent heat of condensation from the exhaust gases thereby cooling the exhaust gases below the dew point temperature such that moisture in the exhaust gases condenses.

Preferably the condensing section includes a counter current exhaust pipe having an internal exhaust pipe for the flow of exhaust gases outwardly to the atmosphere and having an outer pipe, concentric with the internal exhaust pipe wherein intake air is counter-flowed within the space between the outer pipe and across the surface of the internal exhaust pipe thereby causing condensation and cooling of the exhaust gases within exhaust pipe.

Preferably the heat exchanger includes a primary heat exchanger and a secondary heat exchanger, wherein the condensing section is included in the secondary heat exchanger which receives exhaust gases from the primary heat exchanger, the secondary heat exchanger cools the exhaust gases below the dew point temperature such that moisture in the exhaust gases condenses.

The present invention is also a method of optimizing radiant and thermal efficiency of a gas fired radiant tube heater the includes the steps of:
a) deliver intake air to a combustion air blower;
b) the combustion air blower delivers combustion air to a burner for mixing with fuel and burning the fuel-intake air mixture thereby producing combustion gasses which are fired into a radiant tube;
c) placing turbulators within the radiant tube, wherein the turbulators are configured to increase the turbulence within the radiant tube and are placed within the initial 10' to 30' of the radiant tube after the burner thereby increasing the tube temperature and the radiation emitted from this section of the radiant tube.

Preferably the turbulators are placed in a region of the radiant tube where the tube temperature is higher than 600° F. such that they increase the tube temperature by at least 100° F.

Preferably there is also a damper located after the secondary heat exchanger for venting a selected amount of heated excess air from the secondary heat exchanger for use as convective heating air.

BRIEF DESCRIPTION OF THE DRAWINGS

The present concept will now be described by way of example only with reference to the following drawings in which.

DETAILED DESCRIPTION OF THE PREFERRED EMBODIMENTS

Figure 1:
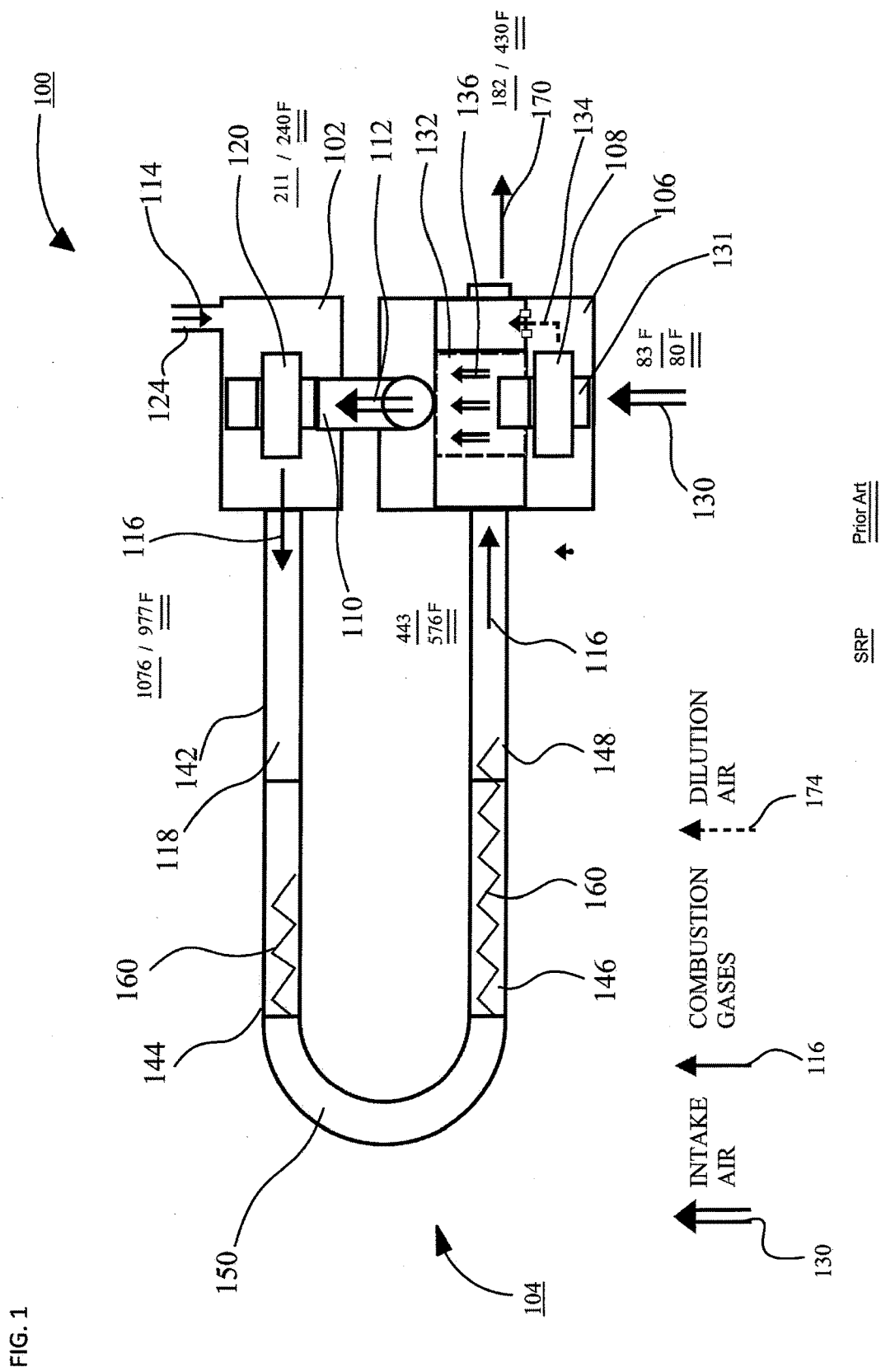
FIG. 1 is a schematic diagram of a gas fired radiant tube heater showing the flow of intake air, combustion air, and dilution air.

The present concept shown generally as a gas fired radiant tube heater 100 includes the following major components or sections: combustion section 102, radiant tube section 104 and heat recovery section 106.

Air for mixing with fuel 114 at fuel inlet 124 is provided by two blowers connected in series namely heat exchange blower 108 and combustion air blower 110.

Fresh intake air 130 is received at cold air intake 131 of heat exchange blower 108. There the intake air stream may be split into two streams namely optionally dilution air stream 134 and heat exchange stream 136. The air moving through heat exchange stream 136 passes through heat exchanger 132 where it is preheated by combustion gases 116 to provide preheated intake air 112 to the second blower namely, combustion air blower 110, which provides the preheated intake air to mix with fuel for combustion purposes.

Combustion air blower 110 receives preheated intake air 112 from heat exchanger 132 and is mixed with natural gas 122 which enters through fuel inlet 124 and is combined at burner 120 to produce combustion 140 thereby producing combustion gases 116. Combustion gases 116 travel along radiant tube 118 of radiant tube section 104 and more particularly travel along a first tube 142, a second tube 144 through elbow 150 onwards through third tube 146, fourth tube 148 where the combustion gases 116 pass through the heat recovery section 106 more particularly heat exchanger 132.

By utilizing preheated intake air 112 one can increase the temperature of combustion gases 116 being emitted out of the combustion section 102 therefore increasing the temperature of radiant tube 118 particularly along first tube 142 and second tube 144. In practice first, second, third and fourth tubes generally speaking are approximately 10 feet in length each.

Radiant energy efficiency is proportional to the radiant tube temperature to the fourth power. In other words the higher the tube temperature the greater the amount of usable radiant energy which is given off by the radiant tube. The radiant energy increase emitted by the radiant tube 118 falls off dramatically as temperature drops below approximately 600° F. Therefore any modifications that can be made to increase temperature in the areas of radiant tube where the temperature is above 600° F. will greatly increase radiant energy efficiency of the gas fired radiant tube heater 100.

Figure 2:
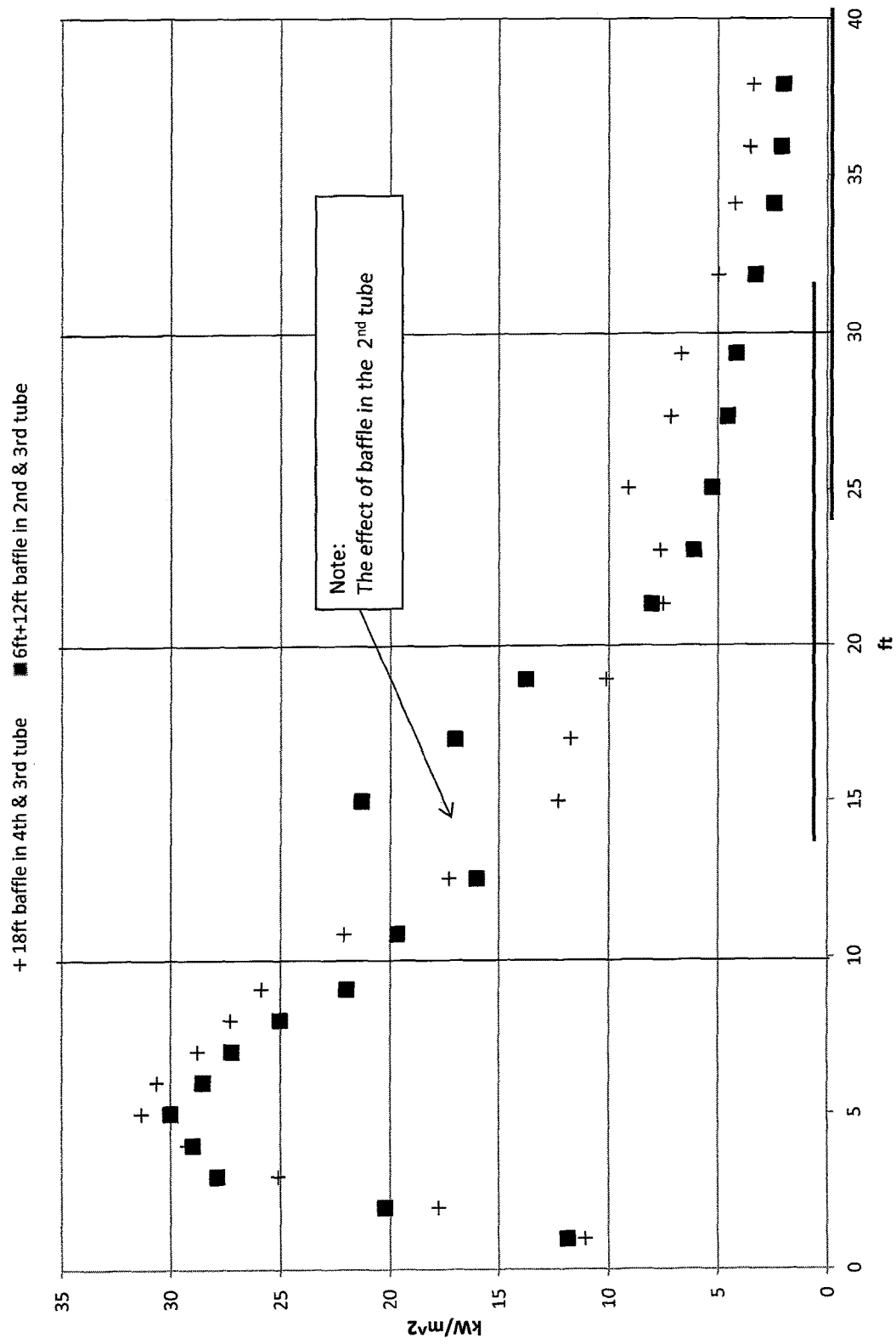
FIG. 2 is a schematic diagram showing measurements of radiant energy taken along the length of a gas fired radiant tube heater fitted with turbulators also referred to as baffles starting at about 14 feet along the radiant tube.
Figure 3:
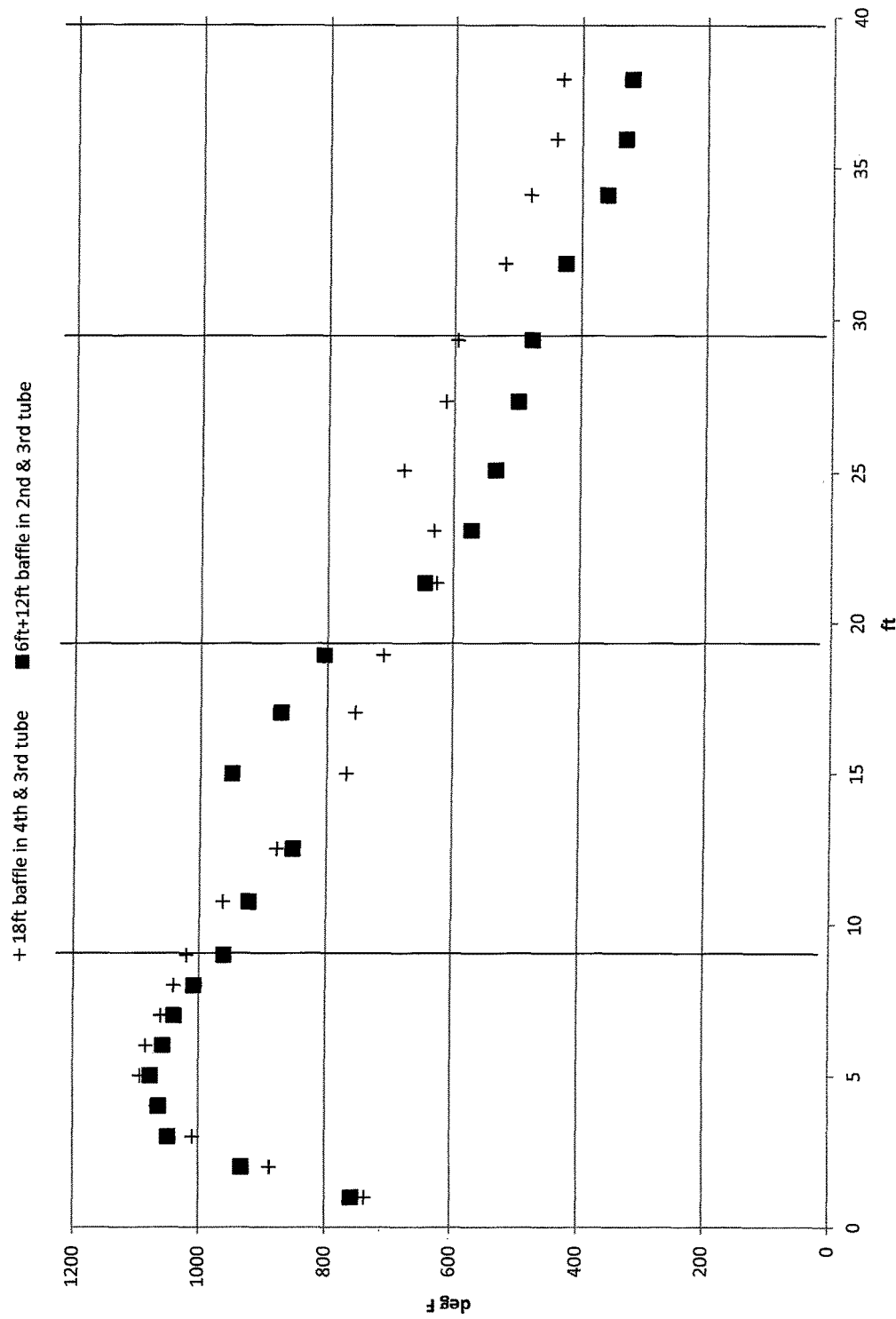
FIG. 3 is a schematic diagram showing temperature taken along the length of the radiant tube with turbulators installed at both the second and third tube and also along the third and fourth tube.
Figure 4:
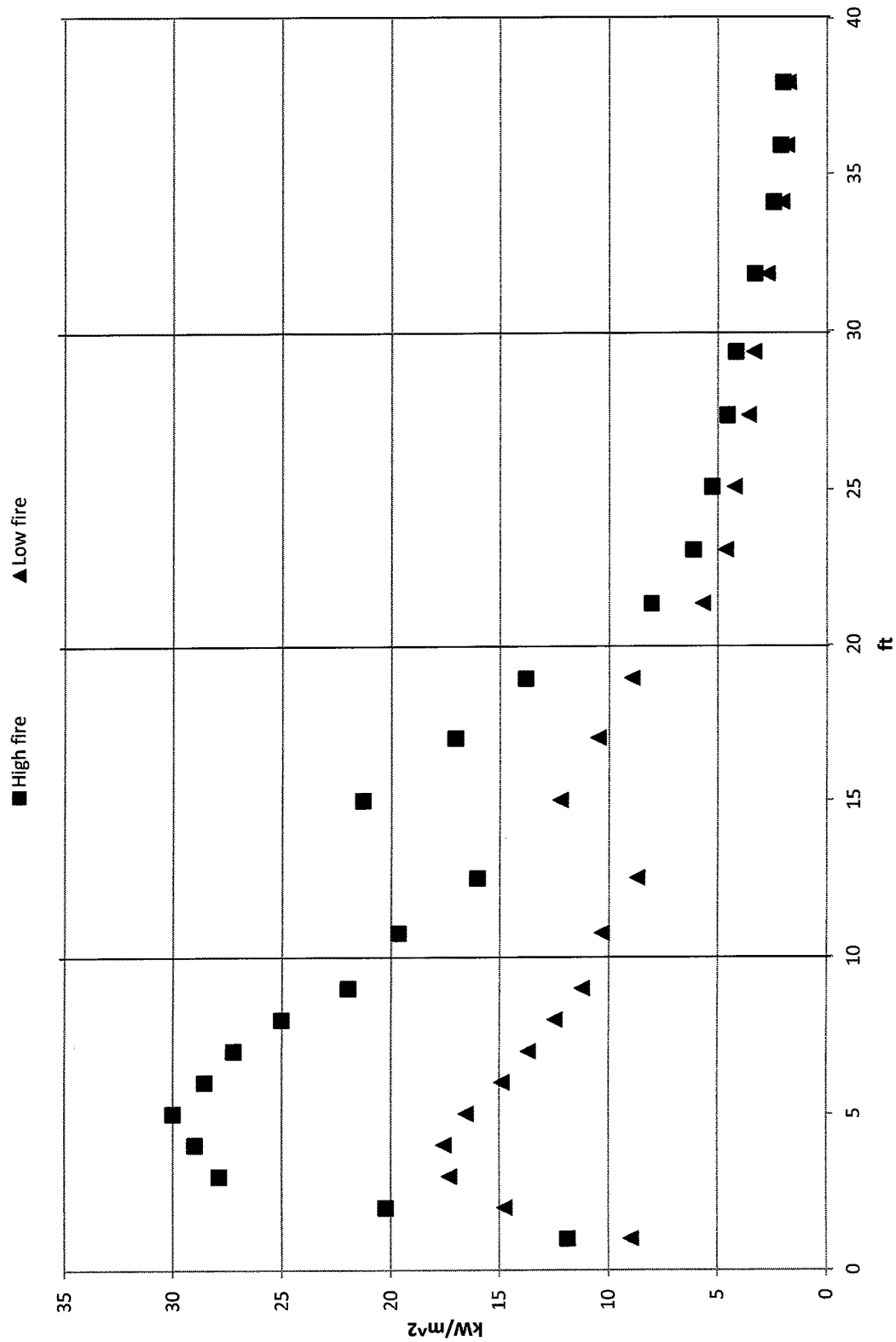
FIG. 4 is a chart showing radiant energy measurements taken along the length of a tube for the scenario of low firing rate and the scenario of the high firing rate.
Figure 5:
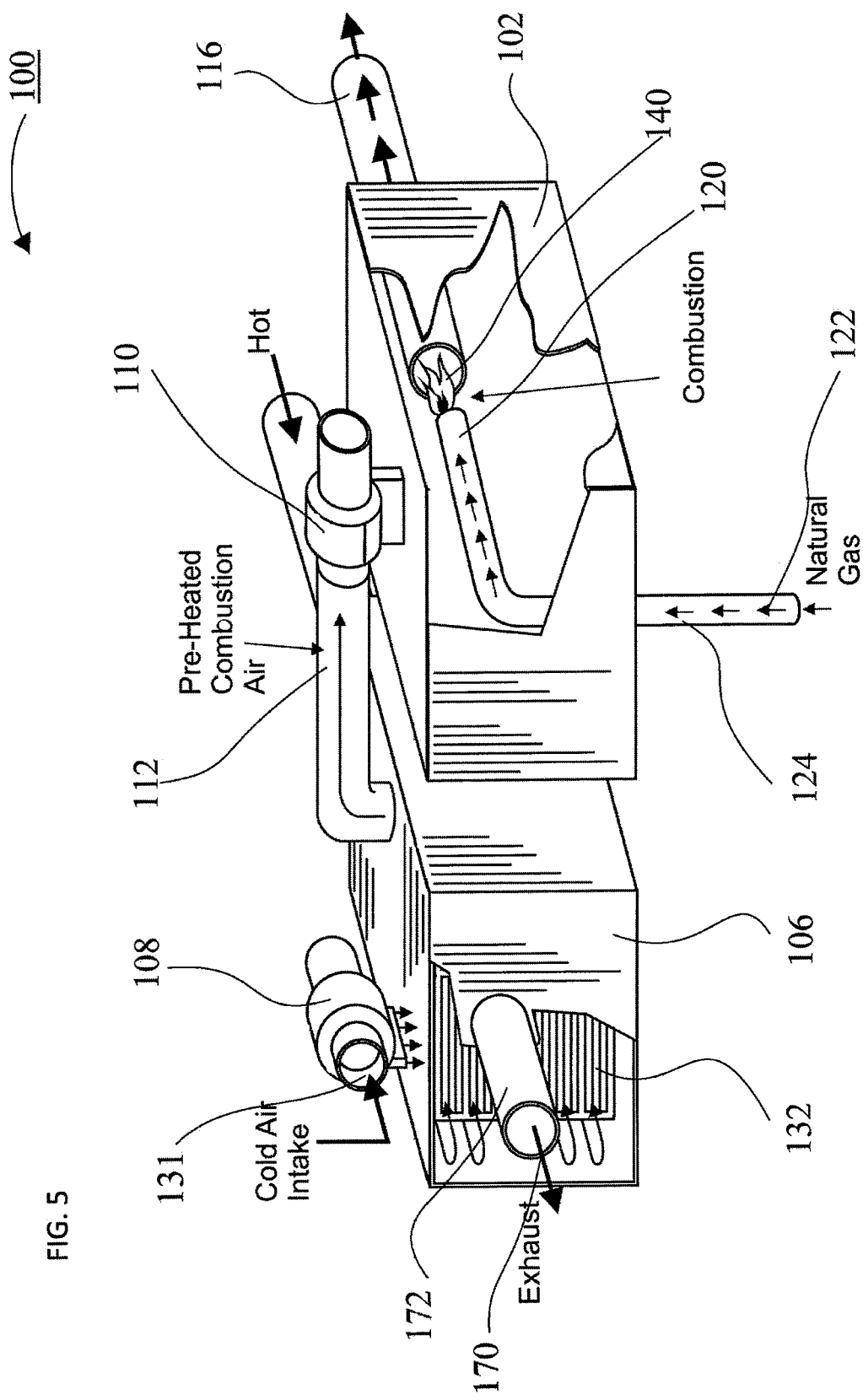
FIG. 5 is a schematic side perspective view of the heat recovery section in the combustion section of the gas fired radiant tube heater.

Therefore the inventors have found that by placing turbulators 160 also known as baffles into the interior of radiant tube 118 at approximately the point in the radiant tube where the temperature is falling off and approaching 600° F. namely shown in this example at approximately the 15 foot mark to approximately the 30 foot mark the increased turbulence provided by the turbulators 160 increases the radiant tube temperature as shown in FIG. 3 and thereby increases dramatically the amount of radiation or radiant energy being emitted by the radiant tubes as depicted in FIG. 2.

Historically turbulators and/or baffles have been utilized more predominantly in the later sections of the radiant tube namely in the third and fourth tube 146 and 148 as depicted in FIG. 1 in order to increase the temperature of the radiant tube in those sections.

The inventor has found that the increase in radiant efficiency by placing turbulators in for example the fourth tube is minimal. The amount of radiation emitted by the fourth tube 148 is greatly diminished since the temperature is well below 600° F. in this section.

The inventor has found however that by placing turbulators 160 also known as baffles earlier along the length of the radiant tube namely in the second tube 144 one is able to increase the temperature in the radiant tube to dramatically increase the radiant energy emitted by the tube from for example approximately 12-13 $kW/m^2$ to approximately 23-24 $kW/m^2$ at the same point along the length of the tube.

Looking at FIG. 2 and FIG. 3 for example at the 15 foot mark the temperature increase due to the use of the turbulator is from about 750° F. to approximately 950° F. or approximately a 200° F. increase in temperature which results in a radiant energy increase from approximately 12 $kW/m^2$ to 23 $kW/m^2$ or over 75% increase in the emission in radiant energy at that point along the tube.

Looking now at approximately the 18 foot point along the radiant tube one will see that the temperature increase is from approximately 700° F. to 800° F. and the radiant energy emitted has increased from approximately 9 $kW/m^2$ to approximately 14 $kW/m^2$.

In other words a small increase in temperature at the higher temperatures namely in the 15 to 25 foot range of the radiant tube results in a dramatic increase in radiant efficiency due to the increased radiant energy emitted by the radiant tube 118.

Once the combustion gases 116 reach the heat recovery section 106 there is still substantial temperature within the combustion gases 116 namely about 435° F. temperature as shown in FIG. 1.

Simply exhausting the combustion gases 116 at this temperature will result in poor thermal efficiencies since a great deal of the heat will simply be sent out as exhaust gas 170.

The inventor has found that in order to improve the thermal efficiency of the gas-fired radiant tube heater 100 one can recover the residual heat from combustion gases 116 using a heat exchanger 132 in order to preheat the intake air 130 which will be provided for combustion in burner 120 in the combustion section 102.

In other words intake air 130 passes through heat exchanger 132 to create preheated intake air 112 having a temperature of about 210° F. which ultimately increases the temperature of the combustion gases 116 fired into radiant tube 118 thereby improving the overall temperatures of the radiant tube 118 and improving the radiant efficiency of gas fired radiant tube heater 100.

In other words by recuperating residual thermal heat from combustion gases 116 one can convert these into increased temperature of combustion gases 116 which ultimately are converted into increased radiant energy efficiencies of gas fired radiant tube heater 100.

In other words thermal losses which normally would be experienced by the exhaust gas 170 can be converted into radiant energy increases at the radiant tube 118.

It is beneficial to be able to limit the exhaust gas temperatures to 230° F. or lower in order to be able to use synthetic or plastic exhaust manifolds 172.

If one is able to keep the exhaust gas temperature below 230° F. one is able to utilize corrosion resistant plastic and/or synthetic materials for the construction of the exhaust manifold 172 thereby minimizing the highly corrosive conditions produced by the exhaust gases 170.

The intake air 130 which is provided to heat exchange blower 108 therefore is split into two steams namely dilution air stream 134 and heat exchange stream 136.

Dilution air stream 134 is cold fresh intake air 130 provided by heat exchange blower 108 and is injected directly and mixed with combustion gases 116 travelling down through radiant tube 118.

By controlling the amount of dilution air one is able to control the residual exhaust gas temperature thereby ensuring that it remains under 230° F.

The reader will note that in FIG. 1 for example by introducing enough dilution air 174 in dilution air steam 134 one is able to lower the exhaust gas temperature to 200° F. thereby bringing it under the threshold to be able to use very corrosion resistant plastic and synthetic materials for the exhaust gas manifold.

In summary the inventor has found that the use of turbulators 160 or baffles located in regions of the radiant tube where it is possible to obtain a temperature increase of 100° to 200° into the temperature range of between 700° F. and 1,000° F. provides for the greatest increase in radiant energy emissions by the radiant tube 118. In other words by placing the turbulator baffle 160 closer to the hottest parts of the radiant tube namely in second tube 144 just after first tube 142 thereby maintaining the tube temperature as high as possible for as long as possible to provide the greatest release of radiant energy and therefore increase the radiant energy and efficiency of the overall system.

Secondly the inventor has found that it is beneficial to recover residual thermal energy by recuperating waste heat from the combustion gases 116 in the fourth tube or the exit section of the gas-fired radiant tube heater 100 by preheating the intake air. This in turn will increase the temperature of the combustion gases 116 leaving the burner 120 thereby increasing the temperatures of radiant tube 118 thereby increasing the release of radiant energy and increasing the radiant efficiency (up to 7%) and the thermal efficiency (up to 5%) of the system. In other words by utilizing the heat exchanger 132 one can convert waste thermal energy into increased radiant energy and thereby convert thermal losses into increased radiant energy. Thermal efficiency measurements were carried out under CSA standards. Radiant efficiency improvements were measured as increases in radiant efficiency relative to prior art or unmodified, conventional radiant heaters. Those skilled in the art recognize there is no accepted world standard for measuring absolute radiation energy efficiencies therefore the best practice at this point in time is to measure relative improvements or differences.

As an additional benefit to the use of the heat exchanger 132 it was found that one is able to reduce the temperature of the exhaust gas 170 to below 230° F. by splitting the air intake into two streams that is exiting the heat exchange blower 108 namely into a dilution air stream 134 and into a heat exchange stream 136. The dilution air stream 134 is air which would be injected into the combustion gases 116 to bring the residual temperature of the exhaust gas 170 down to below 230° F. in order that one could use a highly anti-corrosive material such as plastic for the exhaust manifolds 172.

Figure 6:
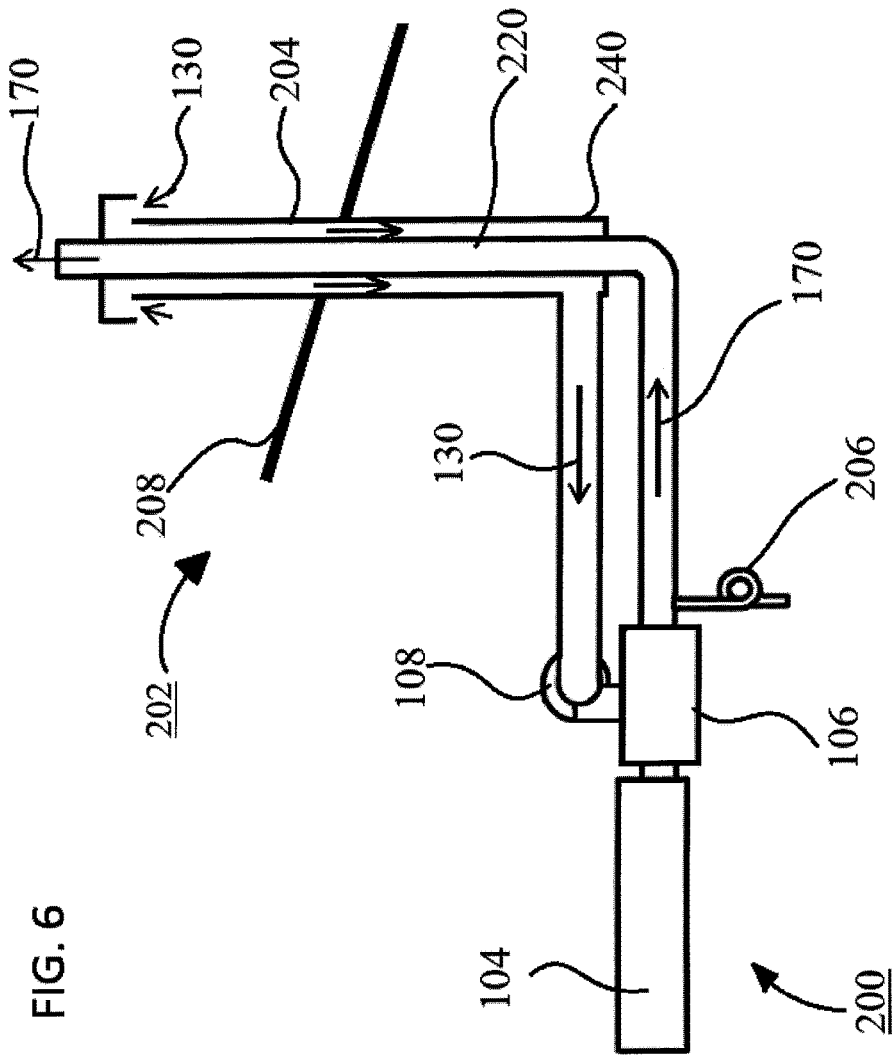
FIG. 6 is a schematic diagram of an alternate embodiment, a gas fired radiant tube heater shown together with a condensing section.

Referring now to FIG. 6 which shows an alternate embodiment namely gas-fired radiant tube heater 200 which includes a condensing section 202 which is shown schematically in the figure. Other than the addition of condensing section 202 gas-fired radiant tube heater 200 contains all of the same components as gas-fired radiant tube heater 100.

Gas-fired radiant tube heater 200 includes radiant tube section 104, heat recovery section 106 which includes a heat exchange blower 108 and condensing section 202 with a counter current exhaust pipe 204.

The condensing section 202 includes a counter current exhaust pipe 204 having an internal exhaust pipe 220 for the flow of exhaust gases outwardly to the atmosphere and having an outer pipe 240, concentric with the exhaust pipe 220 wherein intake air 130 is counter-flowed across the surface of the exhaust pipe 220 thereby causing cooling and condensation of the exhaust gases 170 within exhaust pipe 220.

The exhaust gas 170 exits out of the heat recovery section at under 230° F. and is further cooled by intake air 130 to the point where it condenses and liquid is collected at a siphon 206 and drained away. In this manner intake air 130 is preheated through the counter current exhaust pipe 204 such that further increases in efficiency are accomplished since the pre-heated intake air 112 is yet further increased in temperature prior to reaching the combustion air blower 110.

Therefore by using condensing section 202 one can further increase the thermal and radiant efficiencies since one is able to further increase the tube temperatures and take advantage of recuperating the waste heat of the exhaust gas 170.

Additionally there are installation advantages in that only one aperture is needed through the wall or through the roof line 208 as shown in FIG. 6 for both the intake and exhaust gas conduit.

Figure 7:
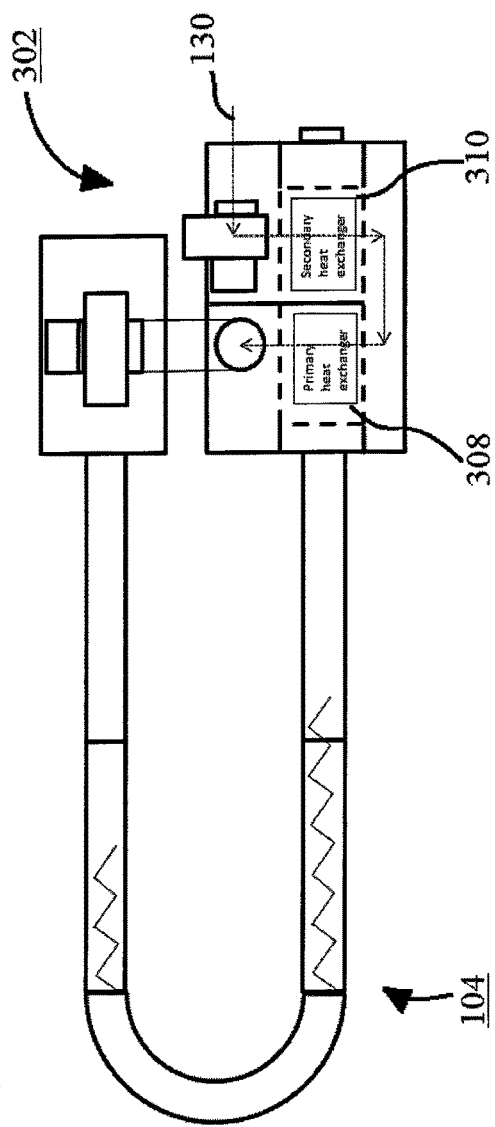
FIG. 7 is a schematic diagram of an alternate embodiment, a gas fired radiant tube heater shown together with a condensing section.
Figure 8:
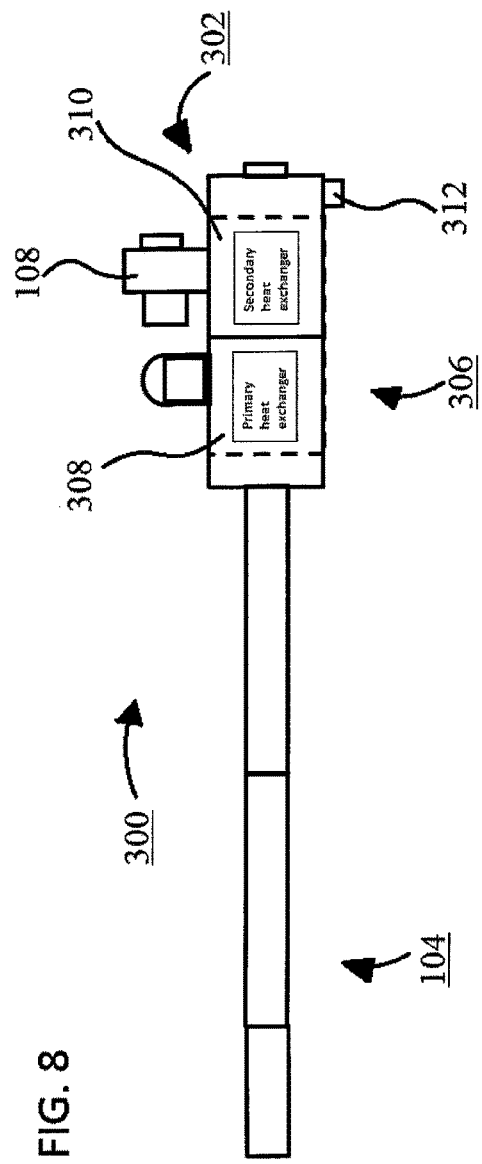
FIG. 8 is a schematic diagram of an alternate embodiment, a gas fired radiant tube heater shown together with a condensing section as shown in FIG. 7.

Referring now to FIGS. 7 and 8 which shows yet another alternate embodiment, a gas fired radiant tube heater shown generally as 300 which also includes a condensing section 302 which is internally located adjacent to the primary heat exchanger 308. Gas fired radiant tube heater 300 is in most aspects the same as radiant tube heater 100 except for the addition of a secondary heat exchanger 310.

Rather than having a counter current exhaust pipe 204 as shown in FIG. 6 one would move the condensing section within the building next to the primary heat exchanger which in the first embodiment 100 above is identified as the heat recovery section 106.

In the gas fired radiant tube heater 300 as shown in FIGS. 7 & 8 the heat recovery section 306 includes the primary heat exchanger 308 which is equivalent to the heat exchanger 132 plus a secondary heat exchanger 310 which is a condensing section 302 and has a condensation drain 312.

In this case it is likely that dilution air is no longer necessary in that the temperature is brought below 230° F. within the secondary heat exchanger 310 namely the condensing section 302.

The heat exchange blower 108 is now positioned in such a manner that it will blow air through both the primary heat exchanger as well as the secondary heat exchanger as schematically depicted in FIG. 7. The flow of intake air 130 is shown in dashed lines in FIG. 7.

Figure 9:
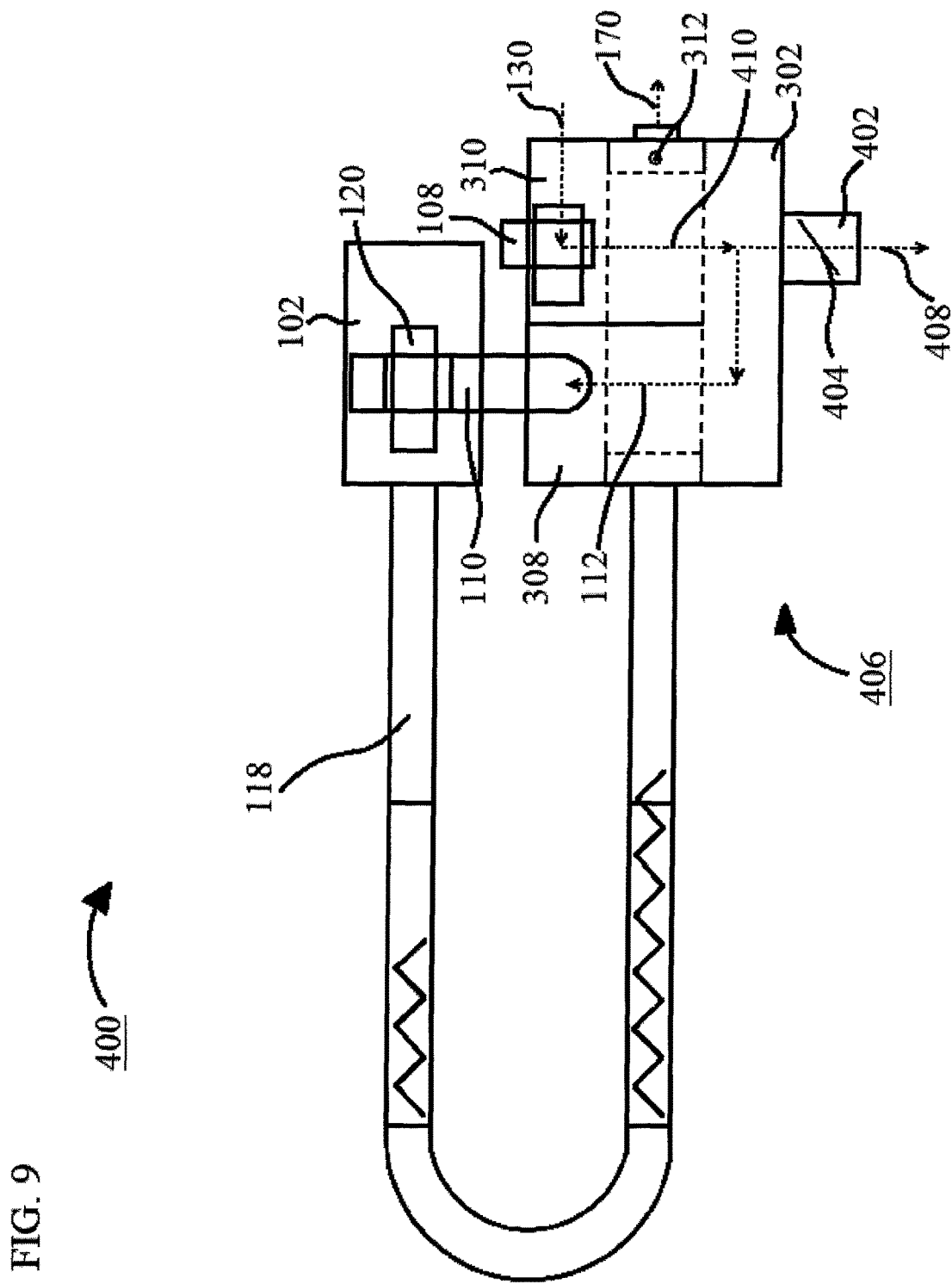
FIG. 9 is a schematic diagram of an alternate embodiment, a gas-fired radiant tube heater show together with a condensing section and excess air outlet.

Referring now to FIG. 9 which shows yet another alternate embodiment, a gas fired radiant tube heater shown generally as 400 which also includes a condensing section 302 which is part of secondary heat exchanger 310 which is internally located adjacent to the primary heat exchanger 308. Condensing section 302 further includes excess air outlet 402. Gas fired radiant tube heater 400 is in most aspects the same as gas fired radiant tube heater 300 except for the addition of an excess air outlet 402.

As in the embodiments depicted in FIGS. 7 and 8 condensing section 302 is located next to primary heat exchanger 308, however could also be positioned other locations.

Heat recovery section 406 includes the primary heat exchanger 308 and secondary heat exchanger 310. Secondary heat exchanger 310 includes condensing section 302 and has a condensation drain 312.

Heat exchange blower 108 is positioned such that it will blow air through primary heat exchanger 308 as well as secondary heat exchanger 310 as schematically depicted in FIG. 9. The flow of intake air 130 is shown in dashed lines in FIG. 9.

Intake air 130 enters through blower 108 and passes through secondary heat exchanger 310 where it is heated to become initial preheated air 410. Initial preheated air 410 continues to primary heat exchanger 308 where it is further heated and becomes preheated intake air 112 before entering combustion section 102. Excess air is released through excess air outlet 402 as heated excess air 408. Heated excess air 408 can be used to provide convective heating in addition to the radiant heating. In other words the heated excess air 408 can be used for additional heating within a building housing the radiant heater 400.

Excess air outlet 402 may be a damper 404 or an orifice located between secondary heat exchanger 410 and primary heat exchanger 308 to control flow of initial preheated air 410 to primary heat exchanger 308, and release a selected amount of heated excess air 408.

Exceeding temperature limits in the combustion air blower 110, combustion section 102 or radiant tube 118 can result in damage to the equipment and significant reductions in equipment life span. Opening damper 404 allows a greater amount of heated excess air 408 to be released from excess air outlet 402. Closing damper 404 reduces the amount of heated excess air 408 that is released. In this manner one is able to balance the system to provide enough combustion air to the burner 120 at a maximum feasible and safe temperature.

It should be apparent to the reader that it is possible to modulate damper 404 for use with a two-stage burner or modulated firing rates.

The reader will note that the use of two blowers namely heat exchange blower 108 and combustion air blower 110 provides for the ability to control much more closely the air requirements of a gas fired radiant tube heater 400 since the heat exchanger blower 108 can be sized to provide enough air to overcome the pressure drop that one sees across heat exchangers 308 and 310 which in many instances can be sizable since high efficiency heat exchangers tend to result in relatively large pressure drops.

Two blowers mounted in series namely, heat exchanger blower 108 and combustion air blower 110 gives one the flexibility to be able to precisely control air movement through the heat recovery section 406 and air movement through the combustion section 102 both of which are critical to obtaining high thermal efficiencies as well as high radiant efficiencies.

The use of two blowers divides the maximum pressure peaks or spikes in the system in approximately half as each blower contributes approximately half of the total pressure and air movement through the system. The efficiency of combustion air blower 110 is improved by the use of heat exchange blower 108 by providing positive or neutral air pressure to the inlet of combustion air blower 110. Heat exchange blower 108 and combustion air blower 110 can operate under more efficient conditions as opposed to a single blower which in the described embodiments would encounter very inefficient blower operating parameters to achieve the desired flows.

Use of two blowers in a gas fired radiant tube heating system provides greater flexibility in control of air pressures, air flows and air temperatures at the heat exchangers and burner, allows for a more compact design compared to the use of a single, larger blower and is an overall less expensive option in terms of blower cost, maintenance and replacement compared to a single, large blower.

It should be apparent to persons skilled in the arts that various modifications and adaptation of this structure described above are possible without departure from the spirit of the invention the scope of which defined in the appended claim.

We claim:

1. Method of using a gas fired radiant tube heater comprising:
   a) blowing intake air with a heat exchange blower through a heat exchanger and delivering the intake air to a combustion air blower, the heat exchanger being a gas to gas heat exchanger;
   b) the combustion air blower receiving the intake air from the heat exchanger and blowing the intake air to a burner for mixing with fuel and burning the fuel-intake air mixture, thereby producing combustion gasses which are fired into a radiant tube; and
   c) passing the combustion gasses through the radiant tube to radiate heat therethrough, and directing the combustion gasses through the heat exchanger to transfer residual heat from the combustion gases to intake air in the heat exchanger to pre heat the intake air before delivery to the combustion air blower.

2. The method of claim 1 further placing turbulators within the radiant tube, wherein the turbulators are configured to increase the turbulence within the radiant tube and are placed in a region of the radiant tube such that they are adapted to increase the radiant energy dissipated by the tube by at least 75% measured in kw/m2 in the portion of the radiant tube with the turbulator.

3. The method of claim 1 further placing turbulators within the radiant tube, wherein the turbulators are configured to increase the turbulence within the radiant tube and are placed in a region of the radiant tube where the tube temperature is higher than 600° F. such that they increase the tube temperature by at least 100° F.

4. The method of claim 3 wherein the turbulators increase the turbulence within the radiant tube and are placed in a region of the radiant tube where the tube temperature is higher than 400° F.

5. The method of claim 1 further placing turbulators within the radiant tube, wherein the turbulators are configured to increase the turbulence within the radiant tube and wherein the turbulators are placed within the initial 10' to 30' of the radiant tube after the burner thereby increasing the tube temperature and the radiation emitted from this section of the radiant tube.

6. The method of claim 5 wherein the turbulators are placed within the initial 10' to 20' of the radiant tube thereby increasing the tube temperature and the radiation emitted from this section of the radiant tube.

7. The method of claim 1 wherein dilution air is introduced into the combustion gases at the heat exchanger in order to reduce the exhaust gas temperature to below 230° F.

8. The method of claim 7 wherein the dilution air is provided by the heat exchanger blower.

9. The method of 7 wherein the exhaust manifold is manufactured from plastic.

10. The method of claim 7 wherein the dilution air is modulated to control the exhaust gas temperature to below 230° F.

11. The method of claim 1 further including the step of:
a) providing a further condensing section which receives exhaust gas from the heat exchanger for further extracting sensible heat and latent heat of condensation from the exhaust gases thereby cooling the exhaust gases below the dew point temperature such that moisture in the exhaust gases condenses.

12. The method of claim 11 wherein the condensing section includes a counter current exhaust pipe having an internal exhaust pipe for the flow of exhaust gases outwardly to the atmosphere and having an outer pipe, concentric with the internal exhaust pipe wherein intake air is counter-flowed within the space between the outer pipe and across the surface of the internal exhaust pipe thereby causing condensation and cooling of the exhaust gases within exhaust pipe.

13. The method of claim 11 wherein the heat exchanger includes a primary heat exchanger and a secondary heat exchanger, wherein the condensing section is included in the secondary heat exchanger which receives exhaust gases from the primary heat exchanger, the secondary heat exchanger cools the exhaust gases below the dew point temperature such that moisture in the exhaust gases condenses.

14. The method of claim 13 further including a damper located after the secondary heat exchanger for venting a selected amount of heated excess air from the secondary heat exchanger for use as convective heating air.

15. The method of claim 1 wherein the intake air is blown at a positive pressure by the heat exchange blower into the combustion air blower.

* * * * *